United States Patent [19]

Kasper

[11] 4,197,978
[45] Apr. 15, 1980

[54] METHOD OF MAKING AN INTEGRAL STRUCTURAL MEMBER

[75] Inventor: James R. Kasper, Seattle, Wash.

[73] Assignee: The Boeing Company, Seattle, Wash.

[21] Appl. No.: 920,901

[22] Filed: Jun. 29, 1978

[51] Int. Cl.² .............................................. B23K 19/00
[52] U.S. Cl. ................................ 228/173 A; 228/265; 228/193
[58] Field of Search ................... 228/173 A, 265, 193, 228/182, 178

[56] References Cited

U.S. PATENT DOCUMENTS

| | | | |
|---|---|---|---|
| 3,340,101 | 9/1967 | Fields, Jr. et al. | 72/54 |
| 3,453,717 | 7/1969 | Pfaffenberger et al. | 228/181 |
| 3,547,599 | 12/1970 | Muser et al. | 228/193 |
| 3,918,623 | 11/1975 | Ishiguro et al. | 228/193 |
| 3,920,175 | 11/1978 | Hamilton et al. | 228/173 A |
| 3,950,841 | 4/1976 | Conn | 228/193 |
| 4,071,183 | 1/1978 | Cogan | 228/173 A |
| 4,084,029 | 4/1978 | Johnson et al. | 428/119 |
| 4,117,970 | 10/1978 | Hamilton et al. | 228/173 A |

Primary Examiner—Daniel C. Crane
Attorney, Agent, or Firm—Lynn H. Hess; B. A. Donahue

[57] ABSTRACT

A method of making an integral structural member including first and second generally planar sections joined together at a transition section which defines fillets at opposite sides thereof. A first workpiece is positioned in a die with a slug of fillet material located adjacent thereto, a second workpiece is superplastically formed against a portion of the first workpiece and against a forming surface of the die, and a portion of the second workpiece combines with the slug of fillet material against the forming surface and the first workpiece to provide the fillets along both sides of the transition section for strengthening the transition section. Temperatures and pressures required for accomplishing the superplastic forming are maintained at diffusion bonding levels for a period of time sufficient to provide diffusion bonding between the workpieces and diffusion bonding of the workpieces to the fillet material.

18 Claims, 9 Drawing Figures

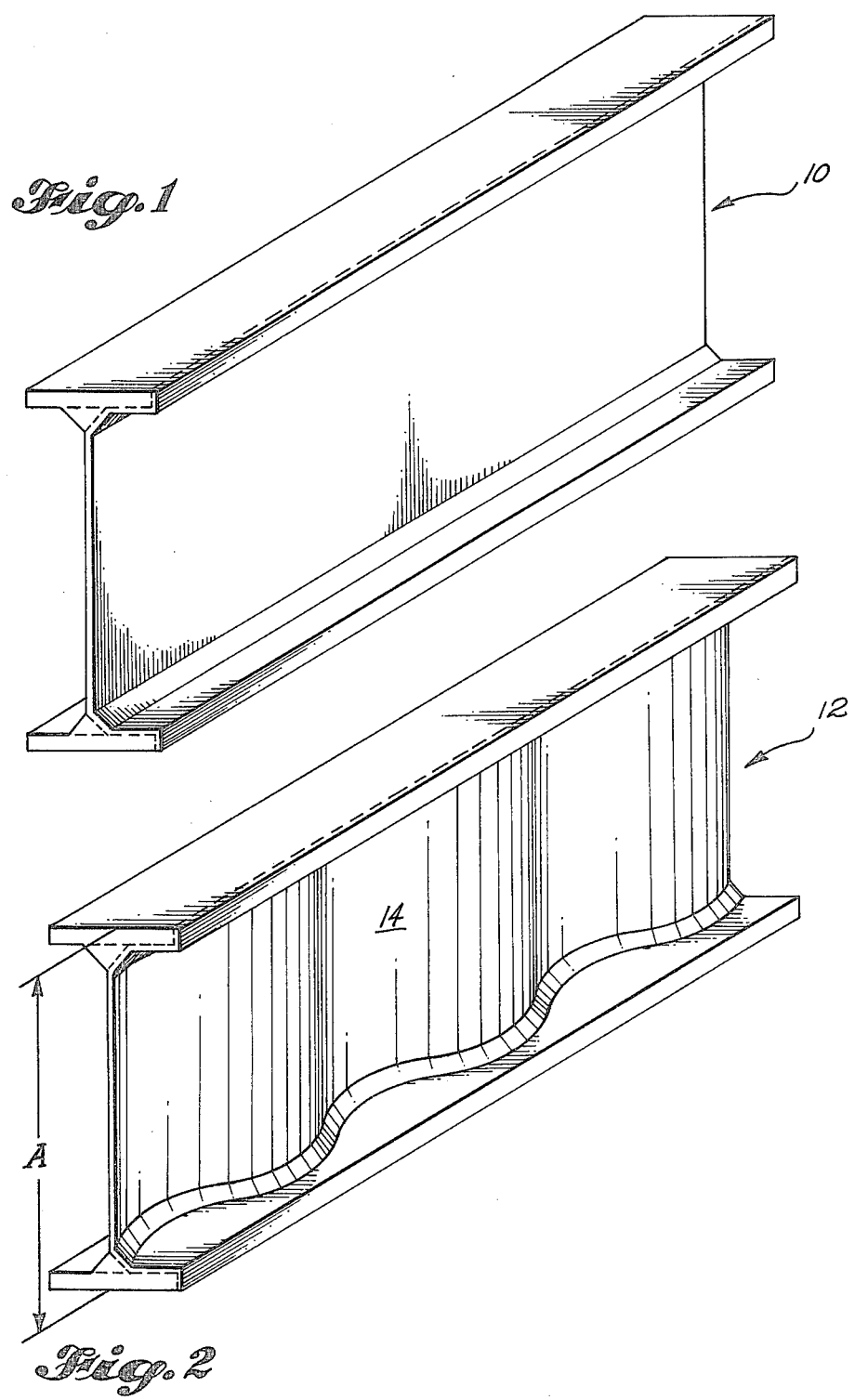

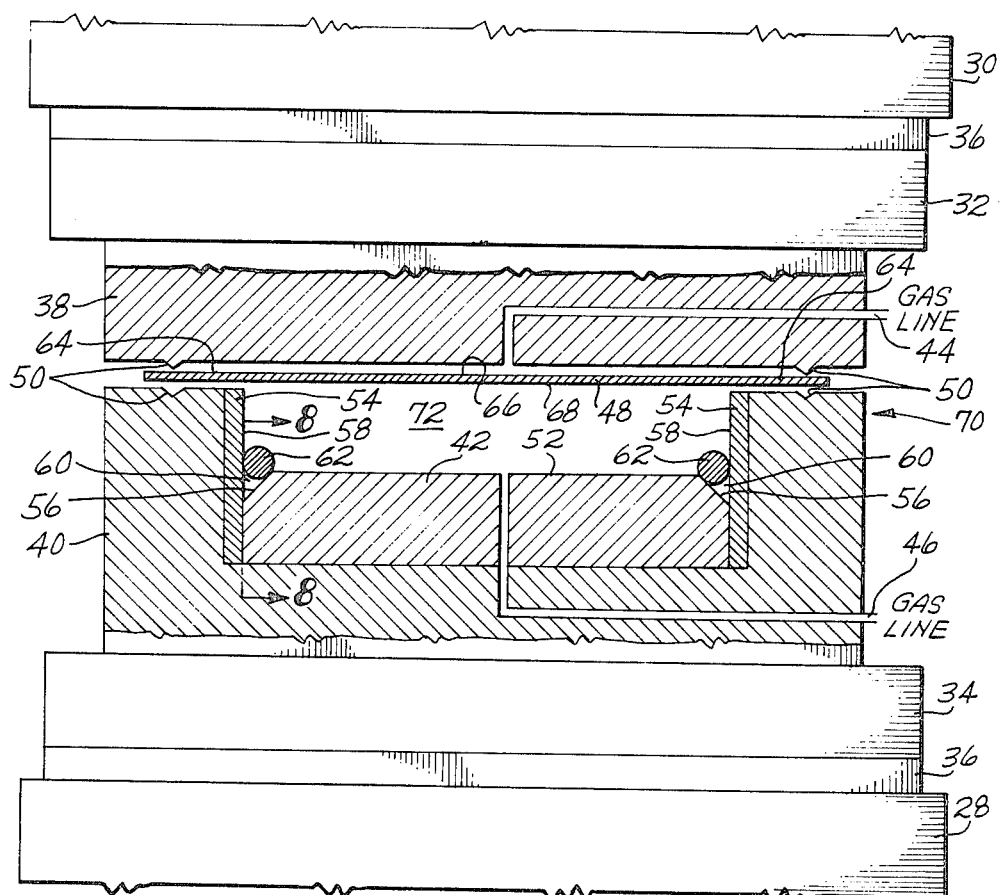

METHOD OF MAKING AN INTEGRAL STRUCTURAL MEMBER

BACKGROUND OF THE INVENTION

This invention relates to methods of manufacturing integral structural members from materials such as metal alloys utilizing superplastic forming and diffusion bonding techniques.

Certain metal alloys such as, for example, titanium alloys are known to exhibit superplastic forming and diffusion bonding properties within specific temperature and pressure ranges; and integral structural members can advantageously be manufactured from such alloys using superplastic forming and diffusion bonding techniques.

One serious problem encountered in the manufacture of structural members by a process of superplastic forming and diffusion bonding is that where two workpieces are joined to form an integral structural member having two generally planar members orientated transversely to each other the transition section between the two pieces will include a fillet along only one side thereof. In such cases the transition section will be subject to stress concentration and will present a weakness in the structural member. It is therefore essential to provide, in such integral structural members, a transition section having a fillet along both sides thereof; and the feasibility of utilizing superplastic forming and diffusion bonding techniques in manufacturing such members depends on a workable process for providing a fillet along the second or opposite side of the transition section.

The U.S. Pat. No. 3,340,101 to Fields, Jr. et al, which issued Sept. 5, 1967, discloses a process for forming certain metals using superplastic forming techniques.

The U.S. Pat. No. 3,920,175 to Hamilton et al, which issued Nov. 18, 1975, discloses a method of fabricating metal structures from a blank and other workpieces by superplastically forming the blank and concurrently diffusion bonding it to the workpieces.

The U.S. Pat. No. 4,084,029 to Johnson et al, issued Apr. 11, 1978, and assigned to the same assignee as the present application discloses a sine-wave beam construction wherein a filler material of plastic or the like is added to a pocket formed by adjacent flange portions and a capstrip. The filler material is added to provide additional beam strength and stiffness. The disclosed beam is constructed from composite materials, and neither superplastic forming nor diffusion bonding are part of the beam's manufacture.

The U.S. Pat. No. 3,950,841 to Conn, which issued Apr. 20, 1976, discloses a method which includes diffusion bonding of metalic members and wherein homogeneous filleted junctures between the members are provided. As disclosed, this method requires ramming tools and a plurality of restraining tools in order to accomplish a joining of the members and creation of the filleted junctures.

Unlike any of the processes disclosed in the foregoing patents, the present invention provides an integral structural member comprising two metal pieces superplastically formed and diffusion bonded together in a single operation with the transition section between the pieces including an integral fillet portion along each side of the transition section.

SUMMARY OF THE INVENTION

It is therefore an object of the present invention to provide a method for manufacturing an integral structural member including two distinct portions, with the structural member comprising first and second pieces and a piece of fillet material superplastically formed and diffusion bonded together so that the transition portion between the two distinct portions includes a fillet on both sides thereof.

It is a further object of the invention to provide a method for manufacturing an integral structural member including two distinct portions joined by a transition portion having a fillet on both sides thereof wherein the structural member is constructed from two workpieces and a piece of fillet material all located in a die, the fillet material being positioned in the die by a fillet-forming recess of the die and by a surface of one of the workpieces, the workpieces and the piece of fillet material being superplastically formed and diffusion bonded together to provide the integral structural member including said fillets.

In accordance with the method of the invention a die including a forming surface is provided, and a first workpiece is placed in said die with a workpiece surface facing the forming surface. A piece of fillet material is located in the die on the forming surface adjacent the workpiece surface, and a second workpiece is positioned over the forming surface and the first workpiece. The second workpiece is then superplastically formed against the forming surface and a portion of the workpiece surface, and the piece of fillet material is superplastically formed and combined with the second workpiece to provide a fillet along both sides of the second workpiece adjacent the workpiece surface. The two workpieces together with the piece of fillet material are then diffusion bonded into an integral structure.

The novel features which are characteristic of the present invention, and other objects and advantages thereof, will be better understood from the following detailed description and the accompanying drawings which together disclose the presently preferred embodiment of the invention.

BRIEF DESCRIPTION OF THE DRAWINGS

FIG. 1 is a perspective view of an I-beam constructed in accordance with the method of the present invention;

FIG. 2 is a perspective view similar to FIG. 1 but showing a sine-wave I-beam constructed in accordance with the method of the present invention;

FIG. 3 is an end view of an I-beam constructed using superplastic forming and diffusion bonding techniques but not in accordance with the method of the present invention;

FIG. 4 is an end view of an I-beam constructed utilizing the method of the present invention;

FIG. 5 is a front view, partially in section, of the press and workpieces prior to closing the dies during the process according to the present invention;

DETAILED DESCRIPTION OF THE INVENTION

Figure 6:
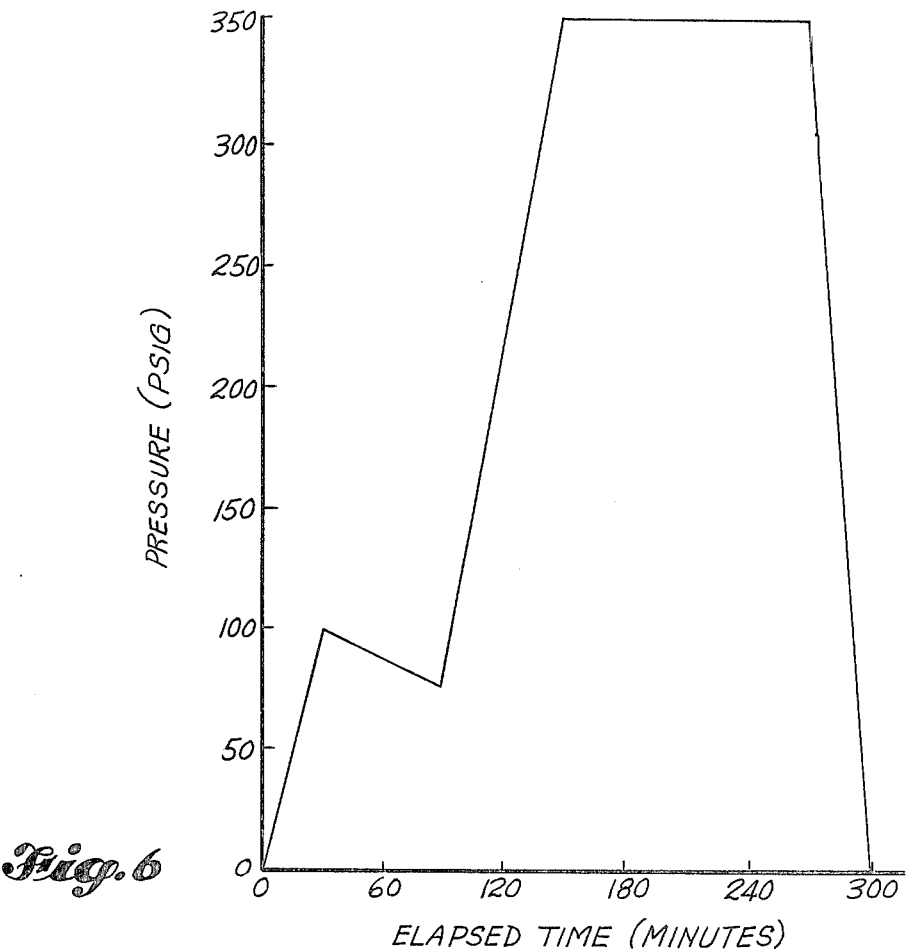
FIG. 6 is a graphical representation of temperature in degrees fahrenheit plotted against elapsed time in minutes.

Integral structural members are utilized in a wide variety of construction applications, and the shape of the member used in any particular application will depend on specific design requirements. For example, one frequently used shape is that of a conventional I-beam such as the one shown at 10 in FIG. 1. Another useful shape for an integral structural member is that of a sine-wave I-beam as shown at 12 in FIG. 2; the primary difference between the conventional I-beam and the sine-wave I-beam being in the web portions of the two members.

The sine-wave I-beam is particularly useful in aircraft applications due to the increased strength of such an I-beam resulting from the sine-wave cross section of its web portion 14. In many aircraft applications, such as for example in the spar sections of an aircraft wing, an integral structural member of the I-beam type will be utilized wherein the height dimension A of the beam member will vary from one part of the beam to another. Typically the height dimension A will be significantly shorter at the respective ends of the beam than at the center portion of the beam's span.

Such integral structural members for use in aircraft applications are usually made from metal alloys such as, for example, certain titanium alloys. These alloys are desirable for use in aircraft because of their relatively high strength-to-weight ratios and because of certain other useful characteristics including superplastic forming and diffusion bonding properties at certain temperatures and pressures.

The manufacturer of structural members through the use of superplastic forming and diffusion bonding techniques is well known in the art, and the Fields, Jr., et al and Hamilton, et al patents hereinbefore cited are but two examples of processes utilizing such techniques.

Referring now to FIG. 3, a conventional I-beam constructed using known superplastic forming and diffusion bonding techniques is shown. The I-beam of FIG. 3 includes a web portion 16a and a pair of flange portions 18a. The beam is manufactured by superplastically forming a first relatively thin sheet of metal over two relatively thicker spaced-apart end pieces and diffusion bonding the thin sheet to the end pieces along the areas of contact 20a therebetween. Although the I-beam shown in FIG. 3 is readily constructed using known superplastic forming and diffusion bonding techniques, such an I-beam is not suitable for use in most aircraft applications because of a serious weakness at the transition sections 22a between the web portion 16a and the flange portions 18a.

It will be seen that the beam shown in FIG. 3 includes a fillet 24a along the upper part of each transition section 22a but no fillet along the lower part of the transition section. It will also be noted that material thinning of the metal sheet due to the superplastic forming process is greater adjacent the transition section than it is along the upper portion of the end pieces. The result of the absence of a fillet along the lower or opposite side of the transition section is a high stress concentration in this area and a consequent greatly-reduced fatigue life for the beam, and this serious weakness is further aggravated by the greater material thinning adjacent the transition section.

The I-beam represented in FIG. 4 was constructed according to the method of the present invention and does not include the weakness in the area of the transition section just described relative to the beam shown in FIG. 3. The beam shown in FIG. 4 includes transition sections or portions 22 between web portion 16 and flange portions 18, and these transition sections 22 each include a lower or opposite-side fillet 26 generally similar to the fillets 24 along the upper parts of the transition portions. In addition, material thinning adjacent the transition section is less than with the beam of FIG. 3, because with the beam shown in FIG. 4 the metal sheet extends vertically downwardly along the bond area 20 from the top of the end piece for a shorter distance and is then supplemented by fillet material at the transition section. Therefore, the beam shown in FIG. 4 minimizes stress concentrations in the transition section of the beam.

The method of the present invention may be performed utilizing the apparatus shown in FIG. 5. This apparatus includes a press having a bed 28 and a ram 30, upper and lower heating platens 32 and 34 respectively, insulation 36 separating the press bed and the press ram from the heating platens, an upper die 38, a lower die 40, and a tool insert 42. A first gas pressure line 44 extends through the upper die from a source of fluid pressure (not shown), and a second gas pressure line 46 extends through the lower die and tool insert from a source of negative fluid pressure (not shown). The upper and lower tools 38 and 40 include means for clamping the workpiece, shown as thin sheet of metal 48, between the tools and for sealing between the tools along the perimeter of the sheet, and this means may take the form of corresponding grooves 50 defined on the tools as shown in FIG. 5.

The lower die defines a forming surface including an upwardly facing surface 52 of the tool insert, and spaces are provided between the tool insert and outside portions of the lower die for locating a pair of workpieces, shown as end pieces 54, in the die. The forming surface also includes surfaces 56 which, together with first surface portions 58 of the end pieces 54 define a fillet groove or chamfer 60. The chamfer 60, as shown, has a cross section conforming to the cross section of the lower or opposite-side fillet to be provided as part of the integral I-beam, and the chamfer may be used to locate a slug of fillet material 62 during the manufacturing process.

The metal sheet 48, as shown in FIG. 5, includes opposite end portions 64 and upper and lower surface portions 66 and 68 respectively. The slug of fillet material 62 may have a cross section conforming generally to the cross section of the chamfer 60 and the portion of the upper fillet 24 which it will fill (see FIG. 4), or may take the form of a wire with a circular cross section as shown in FIG. 5, or may take any other convenient form. The fillet material may be the same metal or metal alloy as the end pieces 54 or the sheet 48, or the fillet material may be a different metal which, for example, might be selected for its ability to flow more easily at superplastic forming temperatures and pressures. Similarly, the sheet 48 and the end pieces 54 may be made either from the same metal or from different metals. Although the material of the sheet 48 must be capable of exhibiting both superplastic forming and diffusion bonding properties, the material of the end pieces 54 need only be capable of exhibiting diffusion bond properties. One metal which is capable of exhibiting both superplastic forming and diffusion bonding properties and is known to be suitable in many applications for any one or all of the workpieces and the fillet material referred to herein is a titanium alloy identified as Ti-6Al-4V.

According to the presently preferred method of the present invention a die 70 is first provided which includes upper and lower die portions 38 and 40 respectively and the tool insert 42 as described in the preceding paragraphs. Two first workpieces such as the two end pieces 54 are then placed in the die as shown in FIG. 5 and positioned in the spaces between lower die portion 40 and tool insert 42 with the surface portion 58 of each end piece facing the forming surface. Two pieces of fillet material such as slugs of fillet material 62 are then placed in the die with one slug of fillet material located in each groove or chamfer 60 and against a surface 58.

A second workpiece such as metal sheet 48 is then placed in the die resting against the uppermost face of the lower die portion so as to cover the forming surface, the slugs of fillet material 62, the end pieces 54, and the grooves 50. The sheet 48 is positioned with surface portions 66 and 68 facing upwardly and downwardly respectively and with end portions 64 over the grooves 50. With the sheet 48 in place the press ram 30 is moved downwardly while the interior space 72 within the die and below sheet 48 is purged with argon gas. The ram moves downwardly until the sheet 48 is clamped firmly between the upper and lower die portions.

The temperature of sheet 48, end pieces 54, and slugs 62 within the die is then raised to 1675 degrees fahrenheit within plus or minus 25 degrees by means of platens 32 and 34 while the space 72 is evacuated by means of gas pressure line 46 to remove any remaining gas pockets. Temperature within the die increases gradually as shown by the graph of FIG. 6 and reaches the 1675 degree level after approximately 30 minutes of time. A complete seal between the upper and lower die portions is obtained as the temperature within the die reaches approximately 1300 degrees.

Figure 7:
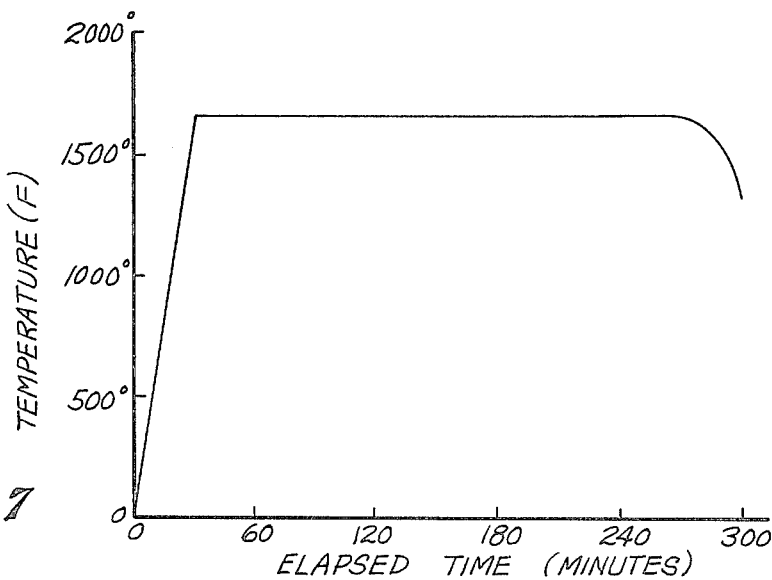
FIG. 7 is a graphical representation of pressure in pounds per square inch (gauge) plotted against elapsed time in minutes.

As the temperature is increased within the die 70, fluid pressure is applied against surface 66 of sheet 48 by means of argon gas supplied through gas pressure line 44. The pressure applied against sheet 48 is varied as shown by the graph of FIG. 7. The pressure is gradually increased during the first 30 minutes to a gauge pressure of 100 pounds per square inch (PSIG) and then gradually decreased during the next 60 minutes to 75 PSIG in order to facilitate a relatively constant strain rate in the sheet 48 as it forms along the end pieces 54, slugs 62, and surface 52. After 90 minutes of elapsed time the pressure is gradually raised over a period of 60 minutes to 350 PSIG and maintained at that level for 3 hours.

During this 270-minute period (0 to 270 minutes elapsed time on the graph of FIGS. 6 and 7) the sheet 48 is superplastically formed against end pieces 54, against slugs 62, and against the surface 52 while the fillet material superplastically forms against end pieces 54 and surfaces 56. Superplastic forming of the fillet or transition portions 22 of the structural member occurs in response to the pressure applied against sheet 48 in the area of the transition section once the sheet has been generally formed along end pieces 54 and surface 52. This pressure is applied through sheet 48 against the slugs 62 so that the fillet material is superplastically formed to the desired shape.

All forming may not be completed until after 150 to 180 minutes of elapsed time, but diffusion bonding will already have begun before that time in some areas. Diffusion bonding will continue during the period while pressure is maintained at 350 PSIG, and this bonding will be generally along the areas of surface contact 20 shown with broken lines in FIG. 4. Diffusion bonding will occur between sheet 48 and end pieces 54, and the fillet material will be diffusion bonded to both the sheet 48 and the end pieces 54.

Once superplastic forming and diffusion bonding are complete (after 270 minutes elapsed time) the pressure is reduced to ambient level over a 30-minute period. The press ram is then moved upwardly to separate the upper and lower die portions, and the structural member is allowed to cool. After cooling, the member is removed from the die and trimmed, this trimming being necessary in order to remove excess material such as the portion of sheet 48 which was clamped between the die portions. Finally, the structural member is cleaned by dipping in a suitable chemical milling solution such as a solution of Nitric and Hydrofluoric acids.

The method or process of the present invention can be applied equally well to the construction of either a conventional or a sine-wave I-beam member and indeed can be utilized advantageously in the manufacture of a wide variety of integral structural members wherein the member includes at least two distinct portions which may be fashioned from separate workpieces.

Figure 8:
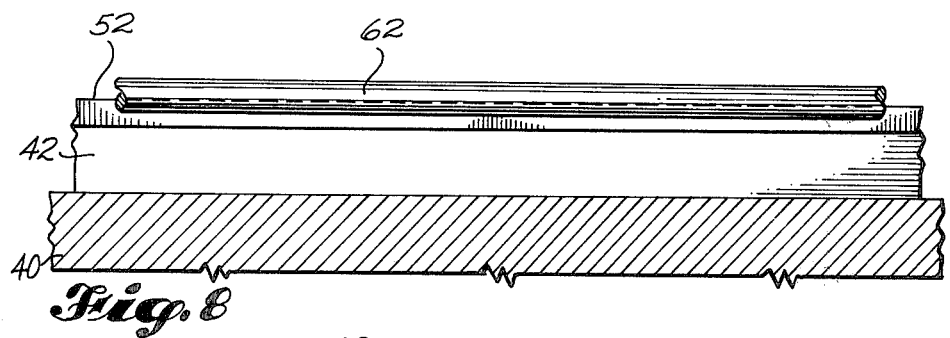
FIG. 8 is a section view taken along lines 8—8 in FIG. 5.

FIG. 8 is a partial section view of the die shown in FIG. 5 and shows the surface 52 of tool insert 42 as a planar surface so that a beam such as the one shown in FIG. 1 having a planar web portion will be formed by the die. As seen in FIG. 8, where a tool insert having a generally planar forming surface is utilized, each slug of fillet material will, prior to forming, rest against a portion of surface 58 of a workpiece 54 and be continuously supported along a surface or edge portion of the tool insert.

Figure 9:
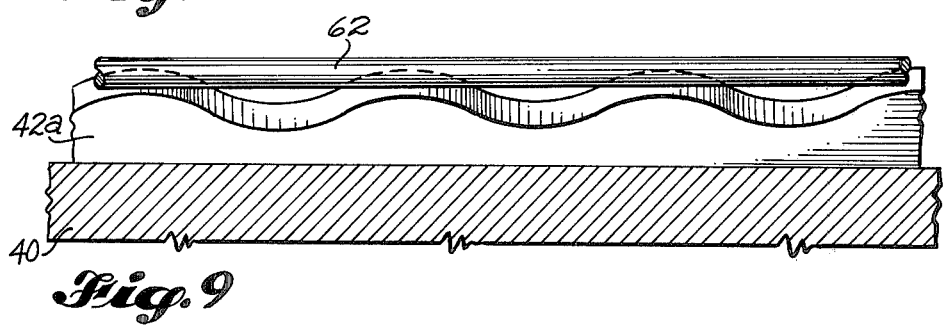
FIG. 9 is a view similar to FIG. 8 but showing a press including a lower die suitable for forming a sine-wave I-beam.

On the other hand, a tool insert having a forming surface with a sine-wave configuration may be utilized to provide a beam such as the one shown in FIG. 2 having a web portion with a sine-wave shape. In this case each slug of fillet material will, prior to forming, rest against a portion of the inwardly-facing surface of an end piece 54 and be supported by intermittent portions of a surface or edge portion of the tool insert. This relationship among the end pieces, tool insert, and slugs of fillet material prior to forming is best seen by reference to FIG. 9. During the forming process the unsupported portions of each piece of fillet material will move downwardly along the inwardly-facing surface of its adjacent end piece so as to fill the entire continuous fillet groove defined by the end piece and the tool insert. The tool insert shown in FIG. 9 has a non-planar forming surface suitable for providing the sine-wave shape in a beam web as already mentioned, and this tool insert is identified at 42a in FIG. 9.

The method according to the present invention therefore allows the use of superplastic forming and diffusion bonding techniques for joining separate pieces in the manufacture of structural members including distinct portions wherein the transition section joining the separate pieces includes fillets on both sides thereof. In accordance with the invention, these fillets on opposite sides of the transition section are easily, quickly, and inexpensively incorporated as an integral part of the structural member and provide, as already indicated, a significant degree of necessary additional strength and increased fatigue life for the member.

The method of the present invention also offers significant advantages in that in accordance with the method the fillet material is initially a separate piece which is not attached to or a part of any other piece. This feature avoids the need for costly and time consuming machining operations to provide a flange or lip of fillet material as part of one of the other pieces, and eliminates the possibility that the presence of such a lip might make it difficult or impossible to bend or contour one of the pieces as, for example, where the end pieces must be contoured to provide a beam having a height dimension A (see FIG. 2) which varies along the span of the beam. Since the separate pieces of fillet material in the disclosed embodiment of the invention are positively located by the tool insert and surface portions of the end pieces, the fillets will be accurately formed without any of the aforementioned diadvantages.

The foregoing description of my invention discloses a preferred embodiment thereof, and various changes in form or detail may be made within the scope of the invention which is defined and limited only by the following claims.

What is claimed is:

1. A method of making an integral structural member including at least two distinct portions, said method comprising the steps of:
    providing a die including a forming surface,
    placing a first member capable of exhibiting diffusion bonding properties and defining a first surface portion in said die with said first surface portion facing said forming surface,
    placing a slug of fillet material capable of exhibiting superplastic forming and diffusion bonding properties in said die adjacent said first surface portion of said first member,
    placing a second member capable of exhibiting superplastic forming and diffusion bonding properties and defining first and second surface portions in said die with said first surface portion covering said forming surface and said first member,
    heating said second member and said fillet material to a superplastic forming temperature,
    applying a pressure against said second surface portion of said second member to cause said second member to form against a portion of said first member, against said fillet material, and against said forming surface, and to cause said slug of fillet material to form against said first member and against said die, thereby providing a fillet between the distinct portions of the structural member which extends on both sides of one of said two distinct portions, and
    maintaining the temperature and pressure in said die at diffusion bonding levels for a period of time sufficient to produce diffusion bonding between said first and second members and to produce diffusion bonding of said slug of fillet material to said first and second members.

2. A method of making an integral structural member as claimed in claim 1 wherein said first member, said fillet material, and said second member are all of identical alloy material.

3. A method of making an integral structural member as claimed in claim 1 wherein said first member, said fillet material, and said second member are all of titanium alloy.

4. A method of making an integral structural member as claimed in claim 1 wherein step 2 includes positioning said first member in said die with said first surface portion thereof defining a plane generally perpendicular to said forming surface.

5. A method of making an I-beam structure including a web portion and a pair of flange portions, said method comprising the steps of:
    providing a forming die including a die surface;
    placing a pair of first workpieces of a material capable of exhibiting diffusion bonding properties in said die, said first workpieces to provide the flange portion of the I-beam;
    placing a separate slug of fillet material capable of exhibiting superplastic forming and diffusion bonding properties in said die adjacent one surface of each said first workpieces;
    placing a second workpiece of a material capable of exhibiting superplastic forming and diffusion bonding properties in said die covering said first workpieces and said die surface, said second workpiece to provide the web portion of the I-beam;
    closing and sealing said forming die so as to locate a perimeter portion of said second workpiece in said die;
    heating said second workpiece, said first workpieces, and said fillet material to a superplastic forming temperature;
    applying a fluid pressure against one surface of said second workpiece to cause said second workpiece to form against said first workpieces, said slugs of fillet material, and said die surface and to cause said slugs of fillet material to form against said first workpieces, thereby providing a fillet adjacent each first workpiece which extends on both sides of the web portion; and
    maintaining the temperature and the fluid pressure within said die at diffusion bonding levels for a period of time sufficient to produce diffusion bonding between said second workpiece and said first workpieces and to produce diffusion bonding of said slugs of fillet material to said first and second workpieces.

6. A method of making an I-beam structure as ckaimed in claim 5 wherein said I-beam structure is a sine-wave I-beam.

7. A method of making an I-beam structure as claimed in claim 5 wherein said first workpieces, said slugs of fillet material, and said second workpiece are all comprised of identical alloy material.

8. A method of making an I-beam structure as claimed in claim 5 wherein said first workpiece, said slugs of fillet material, and said second workpieces are all comprised of titanium alloy.

9. A method of making an I-beam structure as claimed in claim 5 wherein said slugs of fillet material each comprise a wire placed adjacent a first workpiece and extending generally parallel to said first workpiece.

10. A method of making an integral beam structure including a web portion and a flange portion, said method comprising the steps of:
    providing a die defining a forming surface including a principal surface portion and a recessed fillet surface portion;
    providing a first workpiece of a material capable of exhibiting diffusion bonding properties and defining a planar surface, said first workpiece to provide the flange portion of the I-beam;

placing said first workpiece in said die with said planar surface facing said fillet surface so as to define a groove;

providing a slug of fillet material capable of exhibiting superplastic forming and diffusion bonding properties;

placing said slug of fillet material in said die and locating said slug of fillet material within at least a portion of said groove and against said planar surface;

providing a second workpiece of a material capable of exhibiting superplastic forming and diffusion bonding properties and including a web portion, an end portion, and an intermediate portion between said web portion and said end portion;

placing said second workpiece in said die in a position covering said first workpiece, said slug of fillet material, and said principal surface portion of said forming surface;

clamping said second workpiece in said die in said position;

sealing said die;

heating said second workpiece, said slug of fillet material, and said first workpiece to a superplastic forming temperature;

applying fluid pressure in said die against said second workpiece and thereby causing said second workpiece to superplastically form with said web portion against said principal surface portion and said end portion against said planar surface of said first workpiece between said slug of fillet material and the upper end of said first workpiece, and causing said intermediate portion and said slug of fillet material to superplastically form against said recessed fillet surface to provide a transition portion between said first workpiece and said second workpiece having a generally symmetrical cross section;

maintaining the temperature and the fluid pressure in the die at diffusion bonding levels for a period of time sufficient to produce diffusion bonding between said first workpiece and said second workpiece and to produce diffusion bonding of said slug of fillet material to said first and second workpieces.

11. A method of making an integral beam structure including a web portion and a flange portion, said method comprising the steps of:

providing a die including an upper die portion and a lower die portion, said lower die portion defining a forming surface including a fillet-forming recess;

providing a first workpiece, a second workpiece, and a piece of fillet material each capable of exhibiting superplastic forming and diffusion bonding properties;

placing said second workpiece in said lower die portion with an inner face of said second workpiece oriented toward said forming surface;

placing said piece of fillet material in said lower die with said piece of fillet material located in said fillet-forming recess and against said inner face;

placing said first workpiece above said lower die portion to cover said forming surface and said second workpiece;

placing said upper die portion over said first workpiece to located said first workpiece, sealing between said upper and lower die portions around said first workpiece;

heating said first and second workpieces and said, fillet material to a superplastic forming temperature and applying a fluid pressure between said upper and lower die portions above said first workpiece to superplastically form said first workpiece and said piece of fillet material against said forming surface and said inner face and thereby cause the combining of said first workpiece and said fillet material to form upper and lower fillets at a transition portion of said integral beam between said web portion and said flange portion; and maintaining the temperature and the fluid pressure in said die at diffusion bonding levels for a period of time sufficient to produce diffusion bonding between said second workpiece and said first workpiece and to produce diffusion bonding of said piece of fillet material to said second workpiece and to said first workpiece.

12. A method of making an integral structural member including at least two distinct portions, said method comprising the steps of:

providing a die defining a forming surface which includes a recessed edge portion;

placing a first workpiece capable of exhibiting diffusion bonding properties and defining a first surface portion in said die with said first surface portion facing said forming surface to provide a groove between said surface portion and said recessed edge portion;

placing a piece of fillet material capable of exhibiting superplastic forming and diffusion bonding properties in said die so as to be located by said groove;

placing a second workpiece capable of exhibiting superplastic forming and diffusion bonding properties and defining first and second surface portions and an end portion in said die with said first surface portion of said second workpiece covering said forming surface and said first workpiece;

clamping said end portion of said second workpiece against movement relative to said die;

heating said second workpiece and said piece of fillet material to a superplastic forming temperature;

applying a pressure against said second surface portion of said second workpiece to cause said second workpiece to form against a portion of said first workpiece, against said fillet material, and against said forming surface, and to cause said piece of fillet material to form against said first workpiece and against said die, thereby providing a fillet between the distinct portions of the structural member which extends on both sides of one of said two distinct portions; and maintaining the temperature and pressure in said die at diffusion bonding levels for a period of time sufficient to produce diffusion bonding between said first and second workpieces and to produce diffusion bonding of said piece of fillet material to said first and second workpieces.

13. A method of making an integral structural member as claimed in claim 12 wherein the piece of fillet material placed in said die has a circular cross section.

14. A method for making an integral structural member including at least two distinct portions joined together at a transition portion which defines fillets along both sides thereof, said method comprising the steps of:

providing a die including a forming surface;

providing a first member including a surface portion;
locating said first member in said die with said surface portion transverse to said forming surface;
providing a slug of material;
locating said slug of material in said die contacting both said forming surface and said surface portion;
providing a second member including first and second surfaces;
locating said second member in said die transversely to said surface portion and covering said forming surface, said slug of material, and said first member;
heating said second member and said slug of material in said die and applying a fluid pressure against said second surface to cause said second member to be superplastically formed against said surface portion and said slug of material and to cause said slug of material to be superplastically formed together with said second member to provide fillets along both sides of the transition portion between the distinct portions of the resulting structural member; and
maintaining the temperature and pressure in said die at diffusion bonding levels for a period of time sufficient to produce diffusion bonding of said first member, said second member, sand said slug of material to one another to provide said integral structural member.

15. A method of making an integral structural member as in claim 14 wherein said forming surface includes a chamfer such that with said first member located in said die said surface portion and said chamfer define a groove for locating said slug of material in said die.

16. A method for making an integral structural member including at least two distinct portions joined together at a transition portion, said method comprising the steps of:
providing a die including a forming surface;
providing a first member including a surface portion;
locating said first member in said die with said surface portion transverse to said forming surface;
providing a fillet material;
locating said fillet material in said die contacting both said forming surface and said surface portion;
providing a second member including first and second surfaces;
locating said second member in said die transversely to said surface portion and covering said forming surface, said fillet material, and said first member.
forming said structural member in a single operation by superplastically forming said second member against said surface portion and against said fillet material and superplastically forming said fillet material, such that said fillet material together with a portion of said second member adjacent said fillet material provides fillets on opposite sides of the transition portion between the distinct portions of the structural member; and
diffusion bonding said first member, said second member, and said fillet material to one another to provide said integral structural member.

17. A method of making an integral structural member as in claim 16 wherein said forming surface includes a chamfer such that with said first member located in said die said surface portion and said chamfer define a groove for locating said fillet material in said die.

18. A method for making an integral beam structure as claimed in claim 11 wherein as said fluid pressure is applied above said first workpiece said first workpiece superplastically forms against said second workpiece beginning at a distal end thereof, said superplastic forming against said second workpiece continuing until said first workpiece contacts said piece of fillet material and said forming surface.

* * * * *